United States Patent
Haering et al.

(10) Patent No.: US 7,477,974 B2
(45) Date of Patent: Jan. 13, 2009

(54) VEHICLE RESTRAINT DEVICE CONTROL METHOD AND APPARATUS USING DYNAMICALLY DETERMINED THRESHOLD

(75) Inventors: Juergen Haering, Stuttgart (DE); Frank-Juergen Stuetzler, South Lyon, MI (US)

(73) Assignee: Robert Bosch GmbH, Stuutgart (DE)

( * ) Notice: Subject to any disclaimer, the term of this patent is extended or adjusted under 35 U.S.C. 154(b) by 657 days.

(21) Appl. No.: 10/899,521

(22) Filed: Jul. 27, 2004

(65) Prior Publication Data
US 2006/0025912 A1    Feb. 2, 2006

(51) Int. Cl.
*B60R 22/00* (2006.01)
(52) U.S. Cl. .......................................... 701/45; 180/282
(58) Field of Classification Search ................... 701/45, 701/46; 180/282; 280/735; 340/436
See application file for complete search history.

(56) References Cited

U.S. PATENT DOCUMENTS

| | | | |
|---|---|---|---|
| 4,979,763 A | 12/1990 | Blackburn | |
| 5,014,810 A | 5/1991 | Mattes et al. | |
| 5,068,793 A | 11/1991 | Condne et al. | |
| 5,109,341 A | 4/1992 | Blackburn et al. | |
| 5,216,607 A | 6/1993 | Diller et al. | |
| 5,282,134 A * | 1/1994 | Gioutsos et al. | 701/45 |
| 5,339,242 A * | 8/1994 | Reid et al. | 701/45 |
| 5,402,343 A | 3/1995 | Shibata et al. | |
| 5,431,441 A | 7/1995 | Okano | |
| 5,436,838 A | 7/1995 | Miyamori | |
| 5,483,449 A * | 1/1996 | Caruso et al. | 701/46 |
| 5,521,822 A | 5/1996 | Wang | |
| 5,546,307 A | 8/1996 | Mazur et al. | |
| 5,559,699 A | 9/1996 | Gioutsos | |
| 5,583,771 A * | 12/1996 | Lynch et al. | 701/36 |
| 5,667,244 A * | 9/1997 | Ito et al. | 280/735 |
| 5,668,723 A | 9/1997 | Blackburn | |
| 5,758,301 A | 5/1998 | Saito et al. | |
| 5,779,264 A | 7/1998 | de Mersseman et al. | |
| 5,790,404 A * | 8/1998 | Faye et al. | 701/45 |
| 6,061,616 A * | 5/2000 | Ohno et al. | 701/45 |
| 6,157,880 A | 12/2000 | de Mersseman et al. | |
| 6,175,299 B1 | 1/2001 | Manlove et al. | |
| 6,272,412 B1 | 8/2001 | Wu et al. | |
| 6,430,489 B1 | 8/2002 | Dalum | |
| 6,520,536 B2 * | 2/2003 | Foo et al. | 280/735 |
| 6,607,212 B1 * | 8/2003 | Reimer et al. | 280/735 |
| 2002/0087235 A1 | 7/2002 | Aga et al. | |
| 2004/0031637 A1 | 2/2004 | Kocher | |
| 2005/0209757 A1 | 9/2005 | Kueblbeck et al. | |

FOREIGN PATENT DOCUMENTS

| | | |
|---|---|---|
| DE | 4223562 | 9/1993 |
| DE | 4330486 | 3/1995 |
| DE | 10040111 | 2/2002 |
| DE | 10103661 | 8/2002 |
| WO | 2005030536 | 4/2005 |

* cited by examiner

*Primary Examiner*—Dalena Tran
(74) *Attorney, Agent, or Firm*—Michael Best & Friedrich LLP

(57) ABSTRACT

A method of controlling a restraint device in a vehicle, and an apparatus employing the method. The method includes sensing accelerations of the vehicle, determining an energy value, determining a transformed acceleration, retrieving a threshold based on the transformed acceleration, and activating the restraint device when the energy value is above the threshold.

23 Claims, 5 Drawing Sheets

VEHICLE RESTRAINT DEVICE CONTROL METHOD AND APPARATUS USING DYNAMICALLY DETERMINED THRESHOLD

BACKGROUND

Embodiments of the invention relate to vehicle control systems, and more particularly to a vehicle control system to deploy an occupant restraint device.

Restraint devices such as airbags and seatbelts are, in general, actuated during crashes or possible crashes to protect vehicle occupants from injury. The accuracy and timeliness of deployment and actuation are factors in the effectiveness of restraint devices.

Some restraint devices are controlled using algorithms that process accelerations measured in various locations of a motor vehicle. The measured accelerations are analyzed using various functions such as integration (to yield velocity), a sum of squares of the measured accelerations, slopes of the measured accelerations, and the like. The outputs of the functions are compared to thresholds. If the thresholds are crossed, restraint devices are deployed.

SUMMARY

The severity of a crash is, in general, related to the energy dissipated in the vehicle during a crash. When the severity of the crash is low, restraint devices may not need to be actuated. When the severity of the crash is high, restraint devices should be actuated. In one embodiment, the invention provides an actuation system or a restraint device control system in which a signal from an acceleration sensor or an accelerometer is processed to determine a value that approximates the energy of the crash. The approximation is then compared to a dynamically determined threshold that can be based on a vehicle feature to determine whether a passenger restraint should be actuated.

In one embodiment, the invention provides a method of controlling a restraint device in a vehicle. The method includes sensing an acceleration or something that is representative or indicative of acceleration of the vehicle, and determining from the acceleration an energy value that indicates the energy dissipated in the vehicle during the crash. The method also includes determining from the acceleration a transformed acceleration, retrieving a threshold based on the transformed acceleration, and activating the restraint device when the energy value is above the threshold.

Another embodiment includes a method of controlling a restraint device in a vehicle. The method includes sensing a first signal that is indicative of the acceleration of the vehicle, and determining a second signal from the first signal indicative of the acceleration. The method also includes retrieving a threshold that is established based on the first signal and the second signal, comparing the second signal with the threshold, and activating the restraint device based on the comparison.

Yet another embodiment provides an apparatus for controlling a restraint device in a vehicle. The apparatus includes a sensor to sense a plurality of vehicle conditions having values that are indicative of vehicle accelerations, and an accumulator to accumulate the values to obtain an accumulated value. The apparatus also includes a transformer to transform the accumulated value into a transformed value, and a signal generator to activate the restraint device when the accumulated value exceeds a threshold determined from the transformed value.

Still another embodiment provides a vehicle. The vehicle includes a restraint device, a sensor to sense a plurality of values indicative of vehicle acceleration, and a transformer to generate a first signal and a second signal based on the value indicative of vehicle acceleration. The vehicle also includes a processor that has a comparator to compare the first signal with a threshold based on both the first and the second signals. The processor then generates a deployment signal when the first signal is above the threshold. The restraint device is configured to be deployed upon receiving the deployment signal.

Other features and advantages of embodiments will become apparent to those skilled in the art upon review of the following detailed description, claims, and drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION

Figure 1:
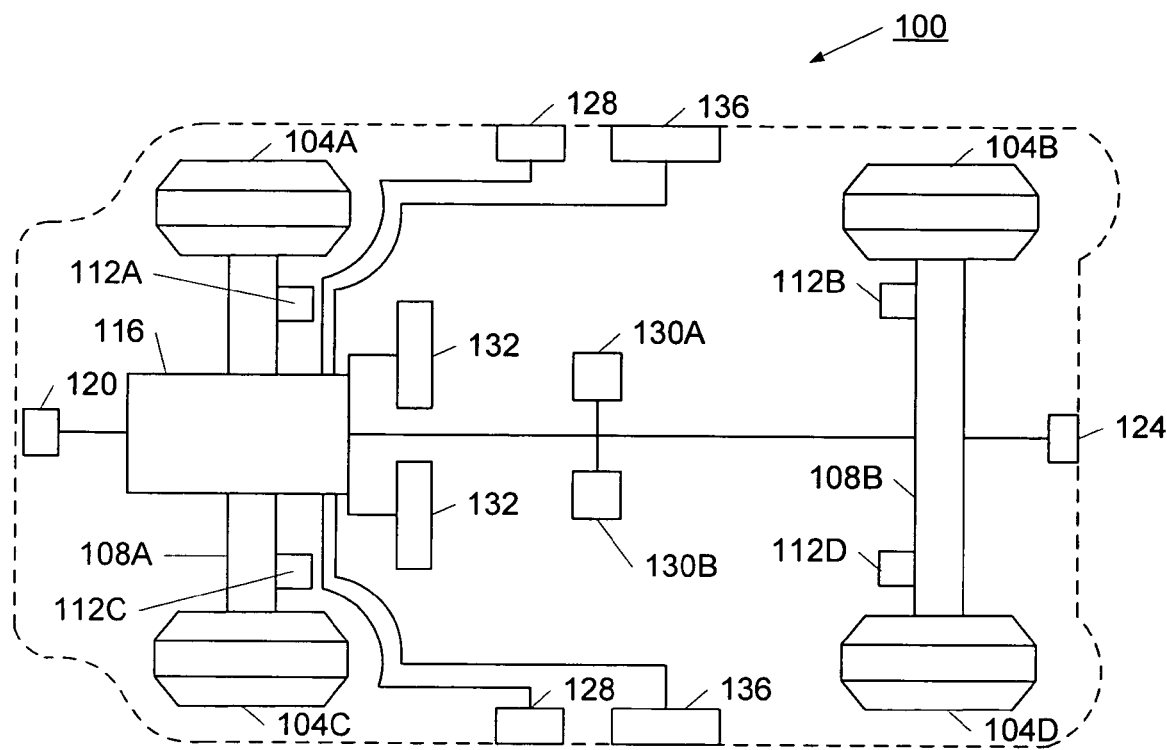
FIG. 1 shows a schematic plan view of a vehicle.

FIG. 1 shows a schematic plan view of a vehicle 100. The vehicle 100 has four wheels 104A, 104B, 104C and 104D. The wheels 104A, 104B, 104C and 104D are connected to two axles 108A and 108B, as shown. The four wheels are monitored by a plurality of wheel speed sensors 112A, 112B, 112C and 112D. The wheel speed sensors 112A, 112B, 112C, and 112D are coupled to an electronic processing unit ("ECU") 116. The vehicle 100 also includes other sensors such as a front bumper sensor 120, a back bumper sensor 124, a plurality of side impact sensors 128, and accelerometers 130A and 130B. The wheel speed sensors 112A, 112B, 112C and 112D, the front bumper sensor 120, the back bumper sensor 124, the plurality of side impact sensors 128, and the sensors 130A and 130B are shown as individual sensors generically. These sensors 112A, 112B, 112C, 112D, 120, 124, 128, 130A, and 130B can also include multiple sensors in a plurality of sensor arrays, for example, that may be coupled to the ECU 116. Other sensor types such as thermal sensors can also be used in the vehicle 100.

The vehicle 100 also includes a plurality of restraint devices such as front airbags 132, and side airbags 136. Although FIG. 1 shows only airbag restraint devices, other types of restraint devices such as seatbelt tensioners, and head and torso airbags can also be used in the vehicle 100.

In one embodiment, a control system 200 (FIG. 2) is used to separate non-deployment crash conditions from deployment crash conditions. The control system 100 receives its input from a sensor array 204 that includes sensors 112A, 112B, 112C, and 112D, the front bumper sensor 120, the back bumper sensor 124, the side impact sensors 128, and the sensors 130A and 130B.

In one embodiment, each of the sensors 130A and 130B detects and monitors a specific condition of the vehicle 100. For example, the sensors 130A and 130B are used to sense a condition of the vehicle that is indicative of an amount of acceleration experienced by the vehicle 100. In some embodiments, the sensors 130A and 130B detect vehicle conditions such as the motion of the vehicle 100. Sensed conditions are then transduced and converted into calibrated signals that are indicative of acceleration of the vehicle 100. If the sensors 130A and 130B are equipped with any calibration circuitry or microprocessor therein, the motions can be converted internally to a calibrated form in the sensors 130A and 130B. Otherwise, the conditions can be converted into calibrated signals by other external processes in a manner known in the art. Furthermore, other sensors such as the front bumper sensor 120, the back bumper sensor 124, the side-impact sensors 128 are used to detect or sense events such as crashes and collisions. Collectively, values of the signals output by the sensors 112A, 112B, 112C, 112D, 120, 124, 128, 130A, 130B, or by the sensor array 204 are referred to as sensed values, or values hereinafter.

Figure 2:
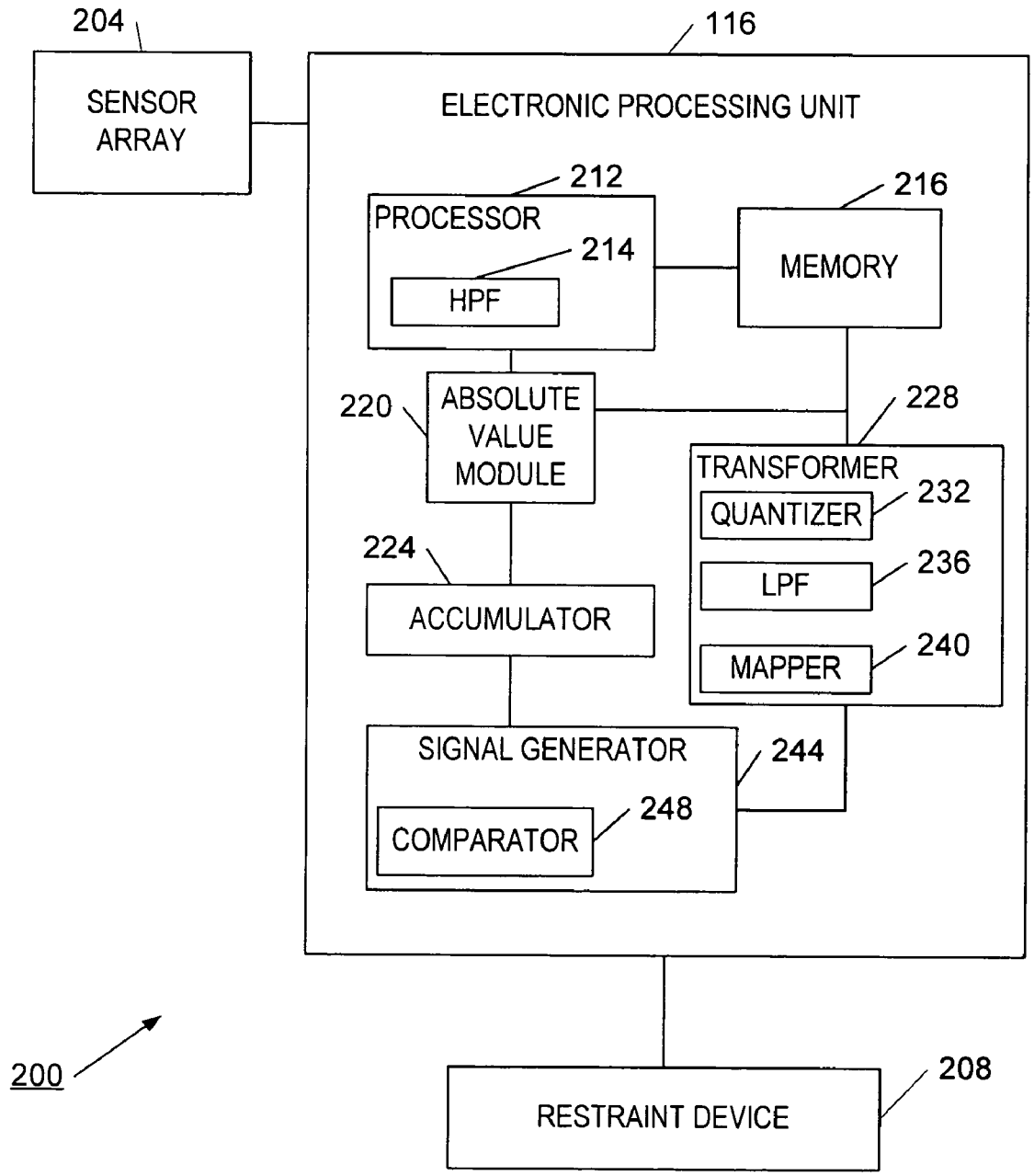
FIG. 2 shows a block diagram of a control system in the vehicle of FIG. 1.

The ECU 116 includes a processor 212 that receives the values from the sensor array 204. The processor 212 then filters the values from the sensor array 204 with a high-pass filter 214, and processes the values according to a program stored in a memory 216. Although the memory 216 is shown as being external to the processor 212, the memory 216 can also be internal to the processor 212. Similarly, although the high-pass filter 214 is shown being inside the processor 212, the high-pass filter 214 can also be external to the processor 212. Furthermore, the processor 212 can be a general-purpose micro-controller, a general-purpose microprocessor, a dedicated microprocessor or controller, a signal processor, an application-specific-integrated circuit ("ASIC"), or the like. In some embodiments, the control system 200 and its functions described are implemented in a combination of firmware, software, hardware, and the like. To be more specific, as illustrated in FIG. 2, the processor 212 communicates with other modules (discussed below) that are drawn as if these modules were implemented in hardware. However, the functionality of these modules could be implemented in software, and that software could, for example, be stored in the memory 216 and executed by the processor 212.

In some embodiments, the high-pass filter 214 filters the acceleration values or signals from the motion sensors 130A and 130B. Frequency components of the acceleration signals that are above a cutoff frequency are allowed to pass through the high-pass filter 214. In some embodiments, the high-pass filter 214 has an adjustable cutoff frequency that can be varied and adjusted to the specific vehicle and requirements at hand. For example, the measured accelerations can be discretely integrated and normalized in a predetermined window to initially obtain low-pass filtered accelerations. The low-pass filtered accelerations can then be subtracted from the sensed accelerations to obtain high-pass filtered accelerations.

The filtered accelerations from the high-pass filter 214 are received at an absolute value module 220. Specifically, an absolute value of each of the filtered accelerations is obtained at the absolute value module 220. An accumulator 224 then sums or accumulates consecutive absolute values that are sensed over a period or a predetermined window of time. For example, in some embodiments, after a first filtered acceleration and a second filtered acceleration have been received at the accumulator 224, the first and the second accelerations are summed to obtain a value that can be indicative of the energy dissipated in the vehicle 100. The accumulated value generally indicates an energy envelope or the energy dissipated in the vehicle 100 during a crash. While accumulating the absolute values of the accelerations provides an indication of the energy dissipated in the vehicle, other energy determining techniques such as summing of the squares of the filtered accelerations can also be used.

A transformer 228 transforms the filtered and absolute valued accelerations from the absolute value module 220 into at least one transformed value. In some embodiments, the transformer 228 includes a quantizer 232 that samples or quantizes the conditioned accelerations with a predetermined quantization resolution. For example, in some embodiments, acceleration amounts between 0 ms$^{-2}$ and 2.99 ms$^{-2}$ can be sampled or quantized to obtain a transformed value of 0 ms$^{-2}$ with a quantization resolution of 3 ms$^{-2}$. Similarly, acceleration amounts between 3 ms$^{-2}$ and 6 ms$^{-2}$ can be sampled or quantized to obtain a transformed value of 3 ms$^{-2}$ with the same quantization resolution. In some other embodiments, the transformer 228 includes a low-pass filter 236 that further filters the filtered accelerations to obtain a transformed value that can be indicative of the velocity of the vehicle 100.

In yet some other embodiments, the transformer 228 includes a mapper 240 that maps the filtered accelerations to obtain a predetermined transformed value in a manner similar to the quantizer 232. In some embodiments, the mapped transformed values used by the mapper 240 are stored in a look-up table in the memory 216. In some embodiments, the mapped transformed values used by the mapper 240 are determined by a mapping formula stored in the memory 216. For example, acceleration amounts between 0 ms$^{-2}$ and 2.99 ms$^{-2}$ can be mapped to obtain a transformed value of 1.5 ms$^{-2}$. Similarly, acceleration amounts between 3 ms$^{-2}$ and 6 ms$^{-2}$ can be mapped to obtain a transformed value of 4.5 ms$^{-2}$. In such a case, the mapped transformed values of 1.5 ms$^{-2}$ and 4.5 ms$^{-2}$ are either stored in the memory 216, or determined by the processor 212 using a pre-determined mapping formula depending on the application at hand. In yet some other embodiments, the transformer 228 can employ a combination of the quantizer 232, the low-pass filter 236 and the mapper 240 to determine the transformed value. In still other embodiments, the transformer 228 can employ an integrator to integrate the acceleration values to obtain transformed values that are indicative of the velocity of the vehicle 100.

Once the transformed value from the transformer 228 has been obtained, the transformed value is used to retrieve a threshold from a look-up table in the memory 216. The threshold generally corresponds to the transformed value. In some embodiments, the processor 212 processes and converts the transformed value into a memory address at which the corresponding threshold is stored in the memory 216. Thereafter, the threshold is retrieved from the memory 216. In some other embodiments, a signal generator 244 processes and converts the transformed value into a memory address at which the corresponding threshold is stored, and retrieves the threshold from the memory 216. That is, the look-up table in the memory 216 can include a plurality of empirically determined transformed values based on the transformation used by the transformer 228.

Figure 2A:
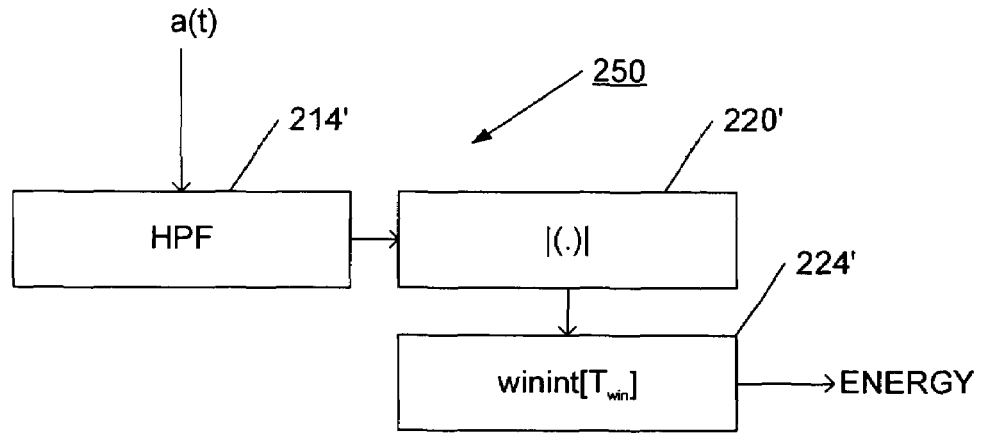
Figure 2B:
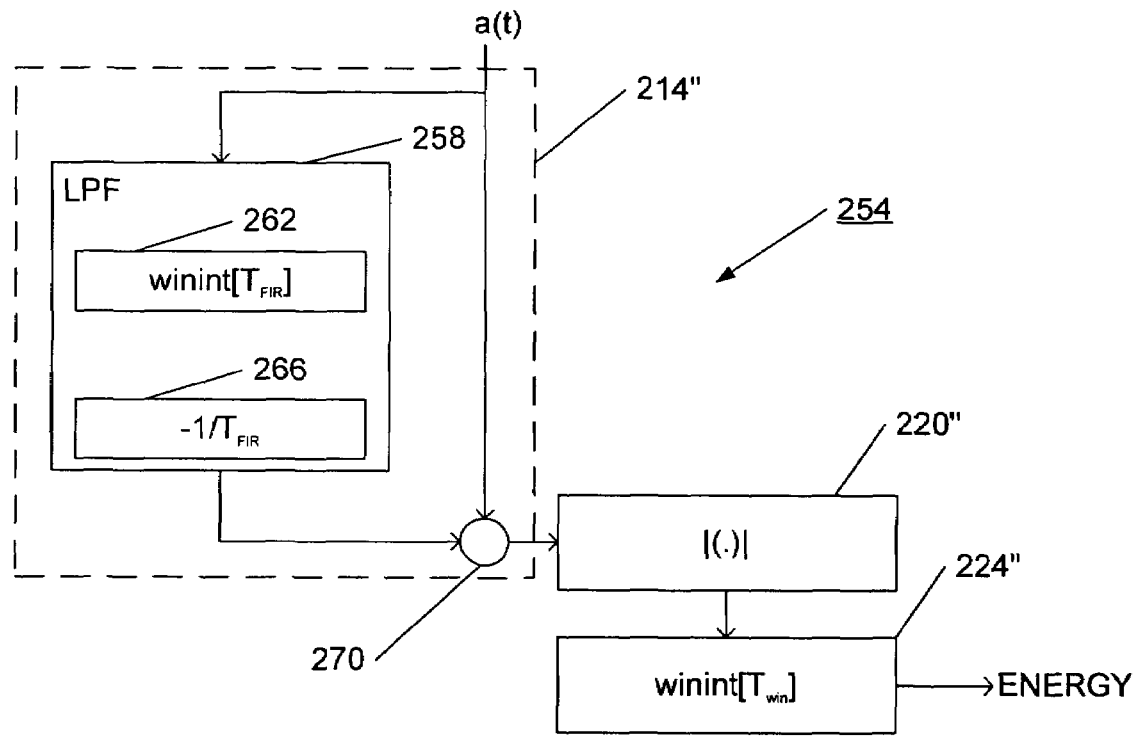

FIG. 2A shows a first exemplary system 250 to calculate a value that is indicative of the energy dissipated in the vehicle 100 using the high-pass filter 214, the absolute value module 220 and the accumulator 224. Once the accelerations have been filtered at a high-pass filter 214', the filtered accelerations are then absolute-valued at an absolute value module 220' to obtain some conditioned accelerations. The conditioned accelerations are then accumulated at an accumulator 224' for a period of $T_{win}$. Similarly, FIG. 2B shows a second exemplary system 254 to calculate a value that is indicative of the energy dissipated in the vehicle 100 using the high-pass filter 214, the absolute value module 220 and the accumulator 224. In such a case, a high-pass filter 214" is implemented with a low-pass filter 258 in a direct form structure. In this case, the low-pass filter 258 includes an integrator 262 having an integration period of $T_{FIR}$, and an amplifier 266 having a gain of $-1/T_{FIR}$. The low-pass filtered accelerations are then added to the accelerations to obtain a plurality of filtered accelerations at a summer 270. The filtered accelerations are then absolute-valued at an absolute value module 220" to obtain some conditioned accelerations. The conditioned accelerations are then accumulated at an accumulator 224" for a period of $T_{win}$. Of course, other implementations of high-pass filters such as a cascade implementation, can also be used depending on application at hand.

Figure 3:
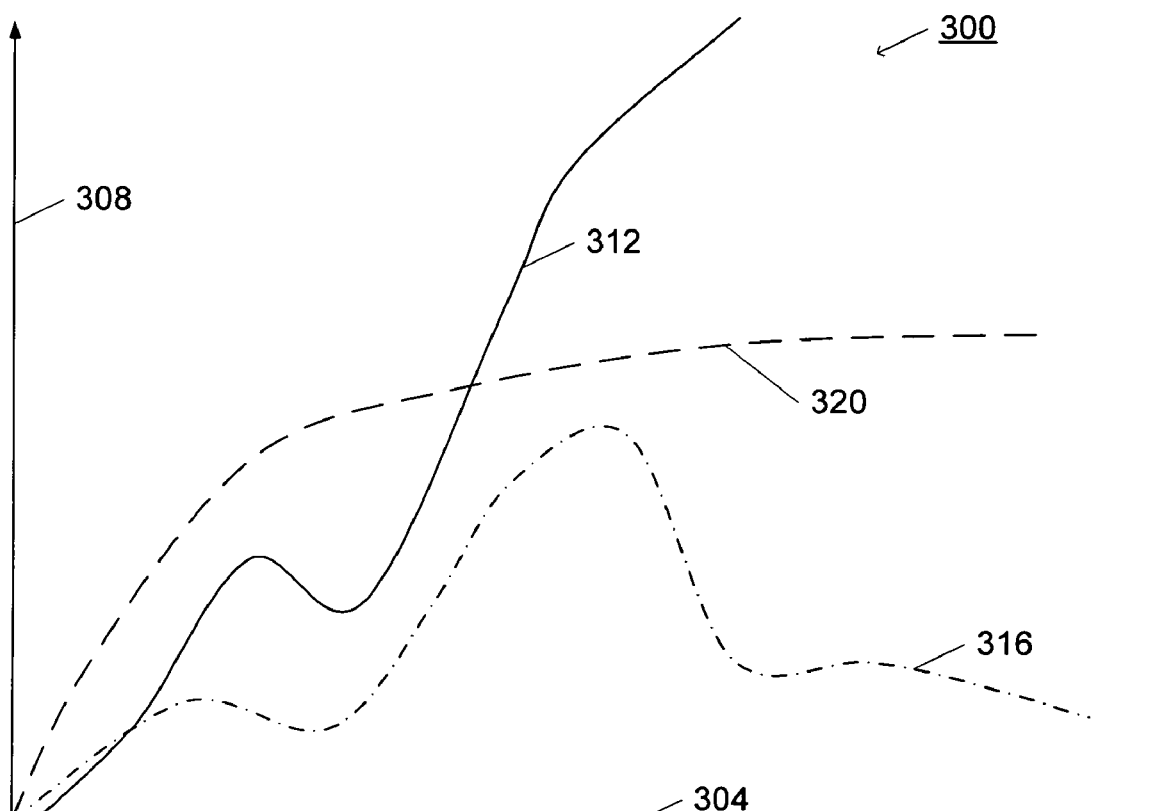
FIG. 3 is a graph of a deployment threshold.

FIG. 3 shows a deployment threshold plot 300. Transformed values are measured along an x-axis 304, and accumulated values are measured along a y-axis 308. Curve 312 illustrates a deployment event or crash in which restraint devices are deployed based on the transformed values and the accumulated values. Curve 316 illustrates a non-deployment event or crash in which restraint devices are disabled based on the transformed values and the accumulated values. Curve 320 illustrates an exemplary threshold that can be stored in the memory 216. In some embodiments, the threshold curve 320 is adjusted such that all non-deployment events remain below the threshold curve 320. In general, the threshold curve 320 is dynamically determined from the accumulated values accumulated over different times, the accumulated values accumulated over a certain number of conditions or accelerations, the transformed values generated from the accumulated values, and the like. For example, a first accumulated value can be obtained from accumulating a plurality of conditioned accelerations over a first period of time, while a second accumulated value can be obtained from the conditioned accelerations over a second period of time. In this way, the accumulated values determined from the two accumulations are different, thereby yielding different transformed values and different thresholds. Once the threshold is exceeded, a deployment event or crash is identified. More specifically in some embodiments, for each of the transformed values, an associated deployment accumulated value is determined by searching the lookup table in the memory 216. Furthermore, the lookup table is generally calibrated using acceleration data determined during crash tests. In some embodiments, acceleration data for a non-deployment crash is also recorded.

Referring back to FIG. 2, the retrieved threshold is compared to the accumulated value from the accumulator 224 at the signal generator 244. In some embodiments, the signal generator 244 includes a comparator 248 that compares the accumulated value to the retrieved threshold. The signal generator 244 activates the restraint device 208 when the accumulated value exceeds the retrieved threshold determined from the transformed value, or when a deployment crash has been identified. Specifically, the signal generator 244 generates a deployment signal that actuates the restraint devices when the accumulated value is above the retrieved threshold. However, the signal generator 244 generates a disabling signal that disables the restraint devices when the accumulated value is below the retrieved threshold.

In some embodiments, the signal generator 244 will only generate an activating signal or deployment signal when the accumulated value is above the retrieved threshold, and will not generate any disabling signal otherwise. In this way, other deployment techniques can also be used to activate the restraint devices. For example, in yet some other embodiments, the signal generator 244 can also generate the activating signal or deployment signal based on a combination of signals generated by other deployment algorithms and the outputs of the comparator 248. That is, signals from additional deployment techniques are combined and processed in the signal generator 244 to arrive at a final deployment decision.

Figure 4:
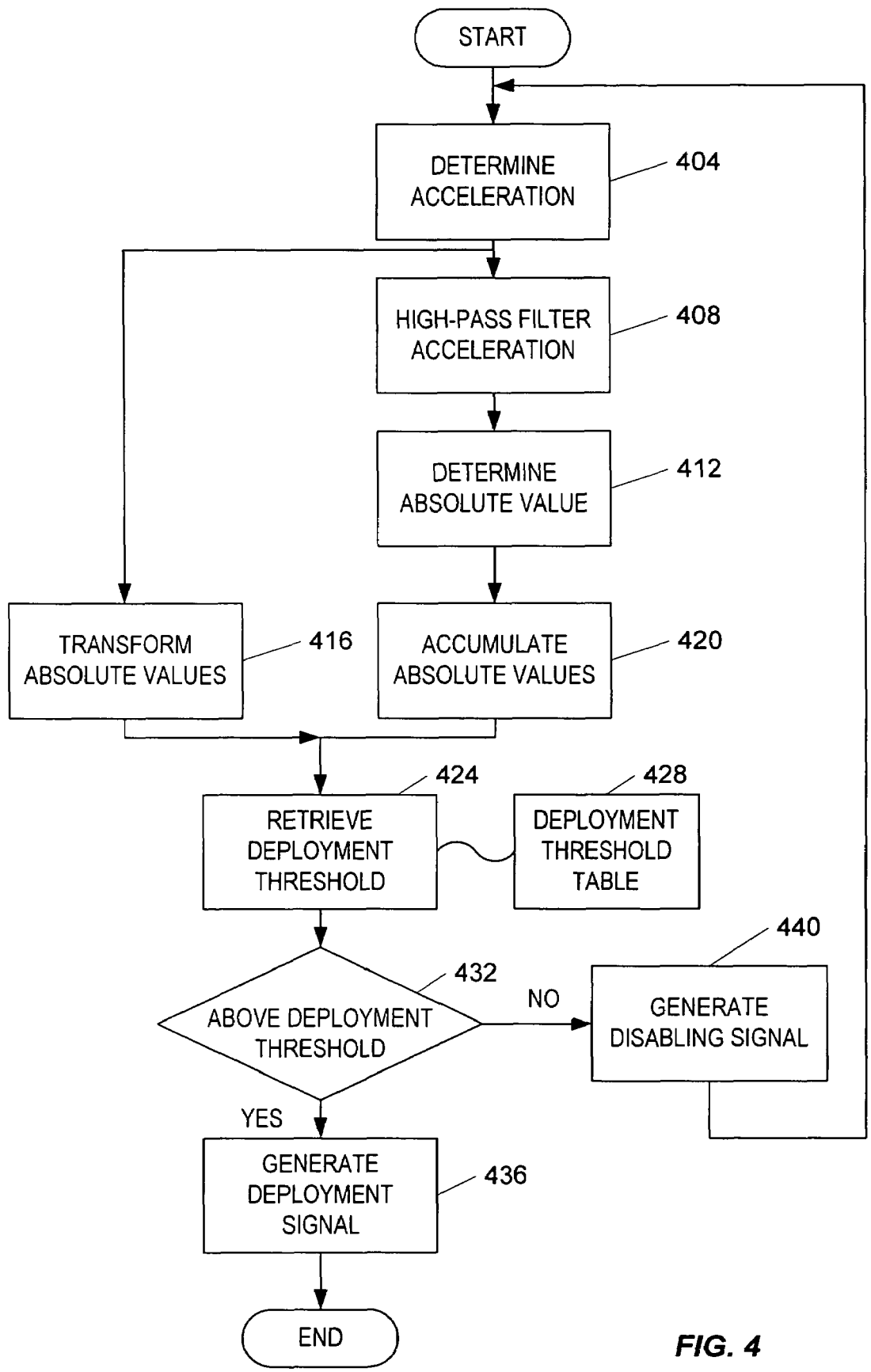
FIG. 4 is a flow chart of processing carried out in embodiments of the invention.

FIG. 4 includes a flow chart 400 that further illustrates processes that occur in some embodiments including processes that may be carried out by software, firmware, or hardware. As noted, the sensors sense accelerations and other parameters. This is shown at block 404. Vehicle conditions, such as the accelerations, are high-pass filtered (as described earlier) to obtain filtered accelerations, as shown at block 408. The filtered accelerations are then processed at the absolute value module 220 to obtain the absolute values of the filtered accelerations as shown at block 412. The absolute values of the accelerations are accumulated (block 420). The accumulated values are indicative of the energy dissipated in the vehicle 100. The values of the accelerations from block 404 are similarly transformed into a plurality of transformed accelerations or transformed values, as shown at block 416. This may be done in a manner that is similar to the technique described above. The transformed values are used to retrieve a threshold at block 424 from a table 428 stored in the memory 216. The retrieved threshold from block 424 is then compared to the accumulated values at block 432. If the accumulated values are above the retrieved threshold, a deployment signal is generated at block 436. If the accumulated values are below the retrieved threshold, a disabling signal is generated at block 440.

Various features of the invention are set forth in the following claims.

The invention claimed is:

1. A method of controlling a restraint device in a vehicle, the method comprising:
    generating one or more signals representative of an amount of acceleration by sensing an acceleration of the vehicle;
    determining an absolute value of the one or more signals representative of acceleration to create one or more absolute values;
    accumulating the absolute values to generate an accumulated value indicative of the energy dissipated in the vehicle;
    determining from the absolute values a transformed acceleration value;
    dynamically determining a threshold based on the transformed acceleration and the accumulated value;
        wherein determining the transformed acceleration value further comprises one or more of quantizing the absolute values, mapping the absolute values, or low-pass the filtering absolute values; and
    generating an activation signal when the accumulated value is above the threshold.

2. The method of claim 1, further comprising high-pass filtering the one or more signals representative of an amount of acceleration.

3. The method of claim 1, wherein determining the accumulated value comprises determining an energy envelope of the acceleration amount.

4. The method of claim 1, further comprising disabling the restraint device when the transformed acceleration value is below the retrieved threshold.

5. The method of claim 1, further comprising activating the restraint device with the activation signal.

6. A method of controlling a restraint device in a vehicle, the method comprising:
   sensing a vehicle condition and creating a first signal indicative of the acceleration of the vehicle;
   high-pass filtering the first signal to create a filtered signal;
   determining absolute values of the filtered signal;
   determining a second signal from the at least one of the absolute values of the filtered signal;
   summing the absolute values of the filtered signal to generate an accumulated value indicative of the energy dissipated in the vehicle;
   dynamically determining a threshold based on the accumulated value and the second signal;
   comparing the second signal with the threshold; and
   generating a deployment signal based on the comparison.

7. The method of claim 6, further comprising activating the restraint device when the value of the second signal is above the threshold.

8. The method of claim 6, wherein determining the second signal further comprises:
   mapping the absolute value of the filtered signal.

9. The method of claim 6, wherein determining the second signal further comprises at least one of quantizing the first or filtered signal, and low pass filtering the first or filtered signal.

10. The method of claim 6, further comprising generating a disabling signal to the restraint device when a value of the second signal is below the threshold.

11. The method of claim 6, further comprising generating an enabling signal to the restraint device when a value of the second signal is above the threshold.

12. The method of claim 6, wherein determining the first signal comprises determining an energy envelope of the first signal.

13. The method of claim 6, wherein determining the first signal comprises determining an energy of the first signal.

14. An apparatus for controlling a restraint device in a vehicle, the apparatus comprising:
   a sensor configured to sense vehicle accelerations;
   an absolute-value module configured to create one or more absolute values of the vehicle accelerations;
   an accumulator configured to accumulate the one or more absolute values to obtain an accumulated value;
   a transformer configured to transform the accumulated value into a transformed value; and
   a signal generator configured to activate the restraint device when the accumulated value exceeds a threshold dynamically determined from the transformed value and the accumulated value,
   wherein determining the transformed acceleration value is accomplished by one or more of quantizing the absolute values, mapping the absolute values, or low-pass the filtering absolute values.

15. The apparatus of claim 14, further comprising a memory capable of storing the threshold.

16. The apparatus of claim 14, wherein the signal generator disables the restraint device when the accumulated value is below the threshold determined from the transformed value.

17. The apparatus of claim 14, further comprising a high-pass filter configured to filter the vehicle accelerations.

18. The apparatus of claim 14, wherein the transformer further comprises at least one of a low-pass filter coupled to the absolute-value module and configured to low-pass filter the absolute value for each of the vehicle accelerations, and a quantizer coupled to the absolute-value module and configured to quantize the absolute value for each of the sensed values, to obtain the transformed value.

19. The apparatus of claim 14, wherein the signal generator comprises a comparator configured to compare the accumulated value and the threshold determined from the transformed value.

20. The apparatus of claim 14, wherein the sensor comprises an accelerometer.

21. The apparatus of claim 14, further comprising a processor coupled to the sensor, and configured to receive the values and to retrieve the threshold.

22. A method of controlling a restraint device in a vehicle, the method comprising:
   sensing at least one amount of acceleration of the vehicle;
   determining from the amount of acceleration a transformed acceleration;
   determining a velocity value from the transformed acceleration by integrating the transformed acceleration;
   retrieving a threshold based on the velocity value;
   determining from the at least one amount of acceleration an energy value indicative of the energy dissipated in the vehicle by determining an absolute value of the at least one amount of acceleration to create one or more absolute values, and accumulating the absolute values to generate an accumulated value; and
   activating the restraint device when the energy value is above the threshold.

23. An apparatus for controlling a restraint device in a vehicle, the apparatus comprising:
   a processor configured to receive a sensed amount of acceleration of the vehicle; determine a velocity value from the amount of acceleration; retrieve a threshold based on the velocity value; determine from the amount of acceleration an energy value indicative of the energy dissipated in the vehicle by determining an absolute value of the amount of acceleration to create one or more absolute values, and accumulating the absolute values to generate an accumulated value; and generate an activation signal when the energy value is above the threshold.

* * * * *